(12) United States Patent
Gowen et al.

(10) Patent No.: US 8,521,628 B1
(45) Date of Patent: *Aug. 27, 2013

(54) SYSTEMS AND METHODS FOR FINANCIAL ASSESSMENT SPECIFIC ADVICE

(75) Inventors: David Brian Gowen, San Antonio, TX (US); Jeffrey R. Hunt, Atlanta, GA (US)

(73) Assignee: United Services Automobile Association (USAA), San Antonio, TX (US)

( * ) Notice: Subject to any disclaimer, the term of this patent is extended or adjusted under 35 U.S.C. 154(b) by 412 days.

This patent is subject to a terminal disclaimer.

(21) Appl. No.: 11/843,470

(22) Filed: Aug. 22, 2007

(51) Int. Cl.
*G06Q 40/00* (2006.01)

(52) U.S. Cl.
USPC .......................................... 705/35; 705/7.11

(58) Field of Classification Search
USPC ................................. 705/35, 7.11
See application file for complete search history.

(56) References Cited

U.S. PATENT DOCUMENTS

| | | | | |
|---|---|---|---|---|
| 5,918,217 | A * | 6/1999 | Maggioncalda et al. ... | 705/36 R |
| 6,012,043 | A * | 1/2000 | Albright et al. ............ | 705/36 R |
| 6,574,600 | B1 * | 6/2003 | Fishman et al. ............ | 704/270 |
| 7,315,837 | B2 * | 1/2008 | Sloan et al. ................ | 705/36 R |
| 2002/0156710 | A1 | 10/2002 | Ryder | |
| 2005/0004855 | A1 * | 1/2005 | Jenson et al. ............... | 705/35 |
| 2005/0010510 | A1 | 1/2005 | Brose et al. | |
| 2005/0144108 | A1 | 6/2005 | Loeper | |
| 2006/0064363 | A1 | 3/2006 | Schwegmann | |
| 2006/0074788 | A1 * | 4/2006 | Grizack et al. ............. | 705/35 |
| 2007/0156559 | A1 | 7/2007 | Wolzenski et al. | |

OTHER PUBLICATIONS

"MortgageLoan, Lenders Compete & You Save" Sitemap, http://mortgageloan.com/sitemap pp. 1-5, MortgageLoan.com, 4721 E. Moody Blvd. Unit # 101, Bunnell, FL 32110.
Financial Calculators, "Try our financial calculators!", pp. 1-4, https://home.commonwealth.com/backoffice/Investments/Calculators/Java/index.html.
KJE Computer Solutions, LLC, "Financial Calculators / Home Budget Analysis / Home Budget Calculator", pp. 1-2, http://www.dinkytown.net/java/HomeBudget.html, Jul. 2007, KJE Computer Solutions, LLC, Minneapolis, MN 55413.
MoneySmith, "MoneySmith Accounting System", pp. 1-2, http://www.moneysmith.net/, Copyright 2004-2006 Bradley J. Smith, Last modified Jul. 20, 2006.

* cited by examiner

*Primary Examiner* — Thomas Dixon
*Assistant Examiner* — Benjamin S Fields
(74) *Attorney, Agent, or Firm* — Kilpatrick Townsend & Stockton LLP (57) ABSTRACT

A financial assessment tool provides a user with specific, actionable advice personalized to the user, based on known and provided user data. In addition to the specific advice, a rationale is provided for the specific advice. Also, resources for additional educational material are provided to help the user understand the context for the advice. The financial assessment tool is available online and uses previously stored data pertaining to the user.

18 Claims, 7 Drawing Sheets

SYSTEMS AND METHODS FOR FINANCIAL ASSESSMENT SPECIFIC ADVICE

CROSS-REFERENCE TO RELATED APPLICATIONS

This application is related by subject matter to that disclosed in the following commonly assigned applications, the entirety of which are hereby incorporated by reference herein: U.S. patent application Ser. No. 11/843,486, U.S. patent application Ser. No. 11/843,495, and U.S. patent application Ser. No. 11/843,500, each filed on Aug. 22, 2007 and each entitled "Systems And Methods For Financial Assessment Specific Advice."

BACKGROUND

Currently available financial assessment tools, sometimes referred to as calculators, include credit and debt tools, retirement tools, auto tools, personal insurance tools, investment tools, and home ownership tools. The financial assessment tools provide general financial and retirement advice. However, these tools do not provide specific, actionable advice personalized to the user. In fact, these conventional tools generally carry disclaimers that they are not intended to provide any sort of financial or retirement advice.

Conventional credit and debt tools, for example, receive a list of income and expenditures entered by a user, and then provide a report or chart so the user can see how much he has left to save and where his money is being spent. Some tools provide general advice such as "reduce the expenses you listed; during one month, every time you would ordinarily spend money on one of the items listed as expenses, write down the amount you didn't spend; at the end of the month, add up the total amount of savings for each item and you will see how much money you saved." The user is otherwise on his own to analyze the information and determine any areas or specific actions for improvement.

Similarly, conventional retirement tools allow a user to enter expected retirement expenses and income, and give the user a listing of his projected financial balances year by year until a certain age, such as 85 years old or 100 years old. Along with the listing, the tool may provide a general statement to the user that he may need to save more or spend less. It is up to the user, however, to analyze the projections and other information and determine any specific action that he should take.

SUMMARY

A financial assessment tool provides specific, actionable advice personalized to the user, using known and provided user data. A rationale is provided for the specific advice, along with resources for additional educational material to help the user understand the context for the advice. The financial assessment tool is available online and uses previously stored data pertaining to the user.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustration, there are shown in the drawings example constructions of the embodiments; however, the embodiments are not limited to the specific methods and instrumentalities disclosed. In the drawings.

DETAILED DESCRIPTION

Figure 1:
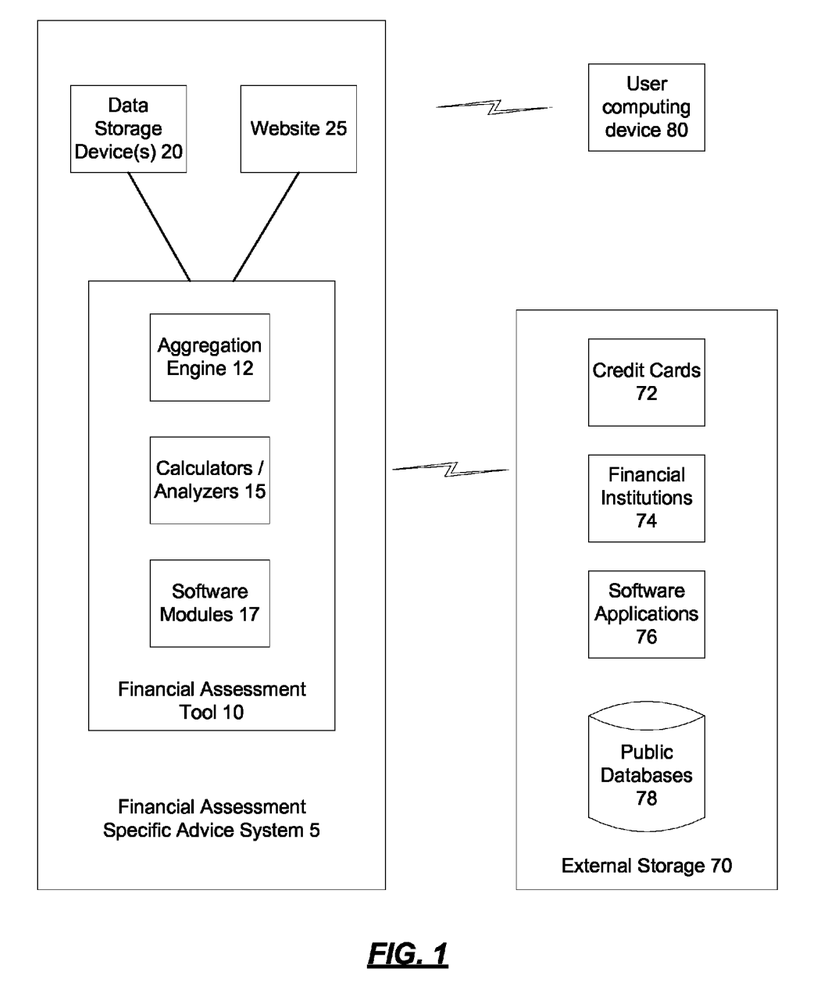
FIG. 1 is a block diagram of an implementation of a financial assessment specific advice system.

FIG. 1 is a block diagram of an implementation of a financial assessment specific advice system. A financial assessment specific advice system 5 may perform a financial assessment determination and may be implemented in a computing device or environment, such as that described with respect to FIG. 7, for example. The system 5 may be maintained by a financial institution, and may comprise a financial assessment tool 10 that provides specific actionable advice personalized to a user. A user may interact with the financial assessment specific advice system 5 via a user computing device 80 over a network, for example, such as a local area network, a wide area network, or the Internet. An example computing device is described with respect to FIG. 7.

Figure 2:
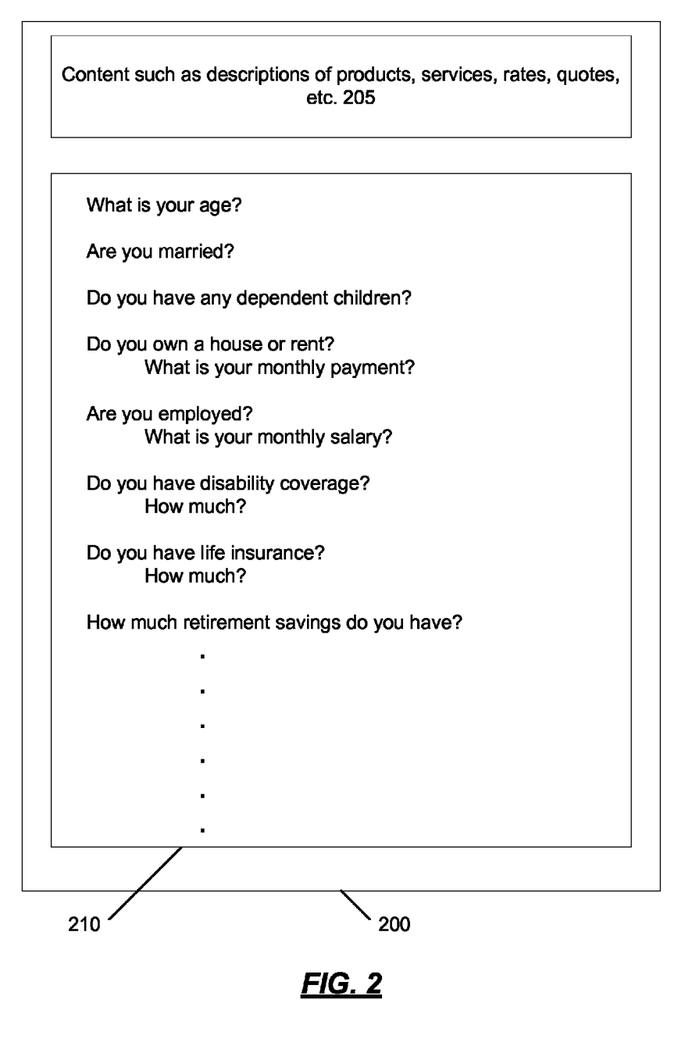
FIG. 2 is a diagram of an example page of content that may be used in an implementation that provides financial assessment specific advice.

Data may be provided to the financial assessment tool 10, via a user entering the data from the user computing device 80 or retrieved from data storage device(s) 20 or external storage 70 or any combination thereof, for example. A user may enter data via a page of content, such as a website 25 maintained by an entity associated with the financial assessment specific advice system 5, displayed on the user computing device 80. Any type of user interface and data file may be used to receive and store data into the page of content. An example implementation is shown in FIG. 2, and is further described below.

Data storage device(s) 20 may contain user information that had been previously received and stored, e.g., with respect to a user's accounts. This data may be personal information such as the user's marital status, age, number of dependent children, employment status, for example, and may be presented to the user for verification.

Various external data sources are shown in external storage 70, such as credit cards 72, financial institutions 74, software applications 76, and public databases 78. The external data sources may be in communication with the financial assessment specific advice system 5 via a network, such as a local area network, a wide area network, or the Internet. Additional example sources of data may include bank accounts, retirement accounts, brokerage accounts, mutual funds, annuities, certificates of deposits, investment accounts, and credit card accounts, for example. Data may be retrieved from the data storage device(s) 20 and external storage 70 and provided to the financial assessment tool 10. The user information that is retrieved from storage may be used to prefill the financial assessment tool 10, and may be presented to the user for verification.

The external data items may be retrieved ("screen scraped") through private third-party websites (e.g., websites associated with credit cards 72 and financial institutions 74) if the user has provided permission and proper credentials for accessing such private third-party websites. Publicly available data might include data acquired from sites and resources such as the stock market, government pages that publish inflation rates, and other items that might be used in financial calculators, for example. Screen scraping is well known, and it is contemplated that any appropriate screen scraping product or technique may be used.

After the data is acquired from storage, it can be used to prefill certain inputs in the calculators and analyzers 15 in the financial assessment tool 10. The fields or items remaining without user data after the population can then be identified and brought to the user's attention, e.g., by highlighting these items on the content page or using another identifying mechanism to show the user what information is still needed. This information, if any, may then be manually provided by the user. The data from the external storage 70 can also be stored in the data storage device(s) 20 after it is acquired.

In an implementation, additional data for use by the financial assessment tool may be requested from the user, and provided by the user, via a page of content 200, as shown in FIG. 2. A user may enter data, requested by the financial assessment tool 10 or a template 210 associated with the financial assessment tool 10, such as, for example, his age, his marital status, whether he has dependents or children, whether he owns a house, whether he has disability coverage, whether he has life insurance, whether he has retirement savings, etc., along with additional data such as particular coverage and amounts. The page of content 200 may also display other content 205 such as services, products, rates, quotes, advertisements, etc.

Thus, data pertaining to areas such as family protection, estate planning, money management, and investing for goals, for example, may be collected and analyzed, with specific advice and recommendations provided in these areas and based on these areas, as described further herein. The data and areas listed here are provided as examples only, and it is contemplated that additional or alternative information may be requested and used by the financial assessment tool 10, depending on the implementation of the financial assessment tool and the particular calculations and analyses that are made.

In an implementation, an aggregation engine 12 receives user data from the external storage 70, as well as from the data storage device(s) 20 (which may contain previously retrieved data and/or data that is hosted by an institution that supports the financial assessment specific advice system 5) and provides it to the calculators and analyzers 15. The user data may be contained within a host financial institution (e.g., the institution that maintains or uses the calculators), or may be contained in external institutions, for example. The received user data may also be stored in data storage device(s) 20. Data that is aggregated may include user profile information, income, expenses, assets, insurance policies and amounts, plan horizon, etc., for example. Additionally, data from investment and retirement accounts that might include retirement accounts, mutual funds, bonds, etc. may be acquired, aggregated, and used in calculations and analysis. The aggregated data may be stored in data storage device(s) 20 for example, and may be automatically updated periodically.

A financial assessment determination is made and analyses and advice are generated by the calculators and analyzers 15 based on the aggregated data. The output of the calculators and analyzers can be stored in the data storage device(s) 20 and/or provided to the user via the user computing device 80, for example.

After retrieving and storing the data from the various sources, each time the user desires a financial assessment determination with specific advice, the financial assessment tool 10 can use the data that had previously been accessed and stored, and can perform the financial assessment determination based on the data. The aggregated data may be used to prefill the fields in the page of content 200 that would otherwise have to be manually populated by the user each time an assessment is desired.

The output of the calculators and analyzers 15 may include personalized user advice along with rationales and resource links, described further herein. In an implementation, different profiles (e.g., employed, retired, married with dependents, married without dependents, etc.) may be stored and used in the financial assessment. The financial assessment tool may be customized to any of the profiles, and is then used accordingly. The specific advice that is provided to the user may be prioritized, and the order of priority may be dependent on aspects of the user's profile. In an implementation, an advice priority order comprising medical insurance, disability insurance, debt and negative cash flow, auto insurance, and long term care, may depend on the user's marital status, employment status, number of dependent children, and age. For example, medical insurance advice may be given the highest priority for one group, while long term care is given the highest priority for another group.

Software modules 17 are shown that may be used in the performance of the example techniques described herein in conjunction with the other various elements and components of the financial assessment specific advice system 5. Example software modules include modules for acquiring and aggregating user data, calculating and analyzing user data, and generating and displaying personalized user advice along with rationales and resource links, described further herein. While specific functionality is described herein as occurring with respect to specific modules, the functionality may likewise be performed by more, fewer, or other modules. The functionality may be distributed among more than one module.

Figure 3:
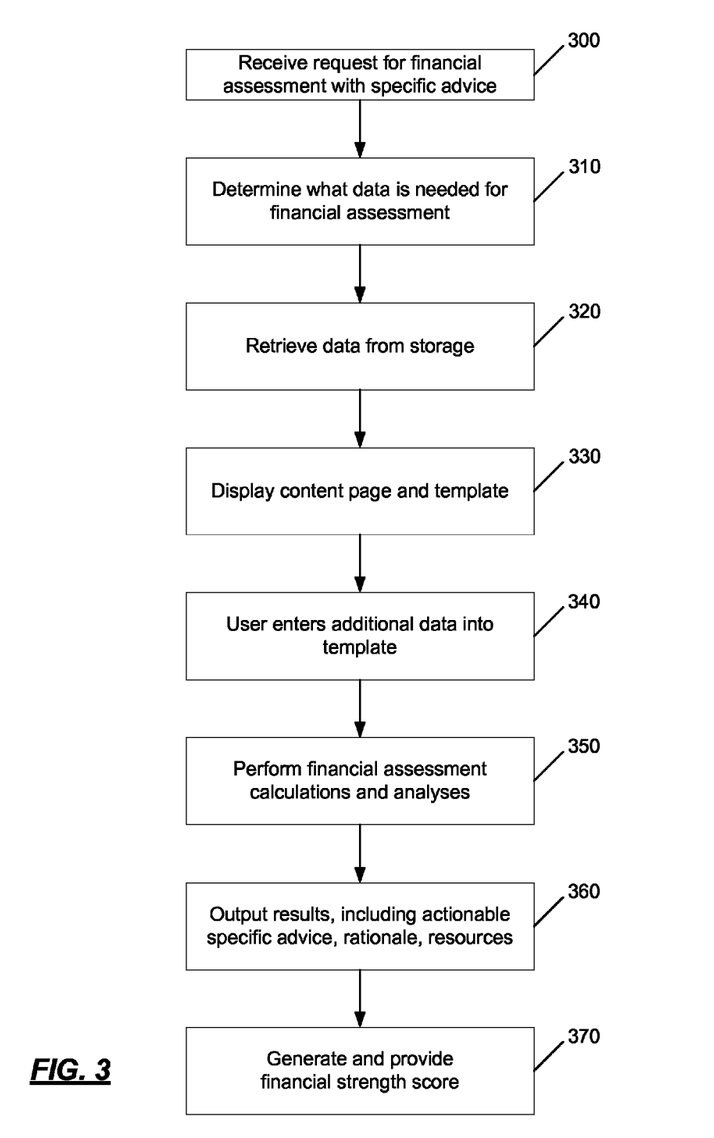
FIG. 3 is an operational flow of an implementation of a financial assessment specific advice method.

FIG. 3 is an operational flow of an implementation of a financial assessment specific advice method. At operation 300, a request for a financial assessment determination with specific advice is received from a user. At operation 310, a financial assessment tool determines what data is needed for the financial assessment and, at operation 320, seeks to retrieve the data from storage, such as local storage or external storage. At operation 330, a page of content is displayed on a user computing device with the retrieved data prefilled into a template to be used for the financial assessment.

At operation 340, the user enters additional data into the template, pursuant to a request or prompt. After the data is entered into the template, the financial assessment tool performs the appropriate calculations and analyses at operation 350 and makes a financial assessment determination. At operation 360, the financial assessment tool outputs the results on a page of content, such as that described with respect to FIG. 4, to be displayed on the user computing device, and/or stores the results of the calculations and analyses in storage. In an implementation, the results may include actionable advice personalized to the user, a rationale for the specific advice, and resources for additional educational material to help the user understand the context for the advice. As described further below, a financial strength score may also be provided, at operation 370.

In an implementation, calculation logic for disability coverage is that if the user is employed, and responds that he does not have disability insurance, then the recommended coverage is 60% of his income. For life insurance, if the life insurance amount entered by the user is less than 7 times his gross annual income, then the user is advised to purchase the additional amount needed to reach 7 times his gross annual income. For a case in which a user has dependents, and either he or his spouse does not have an income, then a recommended caregiver life insurance amount that they should obtain is displayed, such as $250,000, $500,000, etc.

In an implementation, for debt, the monthly debt payments are divided by total monthly income. If the debt is greater than a certain amount, then specific advice is provided to get the user out of debt in a particular period of time. For an emergency fund, if the user's amount saved is less than six (months) times his monthly expenses plus his monthly debt payments, then specific advice is provided to increase the user's emergency fund amount to a particular amount. For retirement savings, if the combined employee and employer contributions are less than 15% of the user's gross annual income, then specific advice is provided to get the user to increase his contribution to 15%. The number, percentages, and other formulas used in these calculations are intended to be examples only, and may be changed, modified, combined, or eliminated in various implementations.

Figure 4:
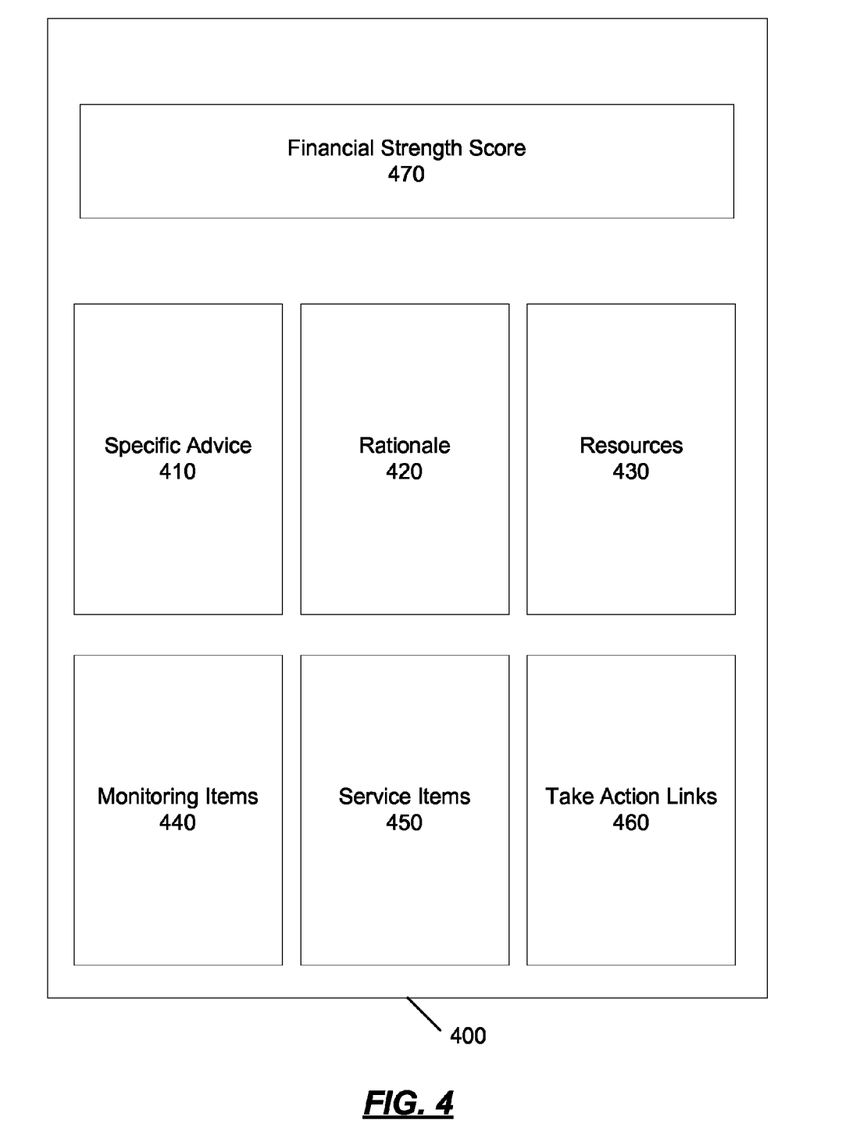
FIG. 4 is a diagram of another example page of content that may be used in an implementation that provides financial assessment specific advice.

FIG. 4 is a diagram of another example page of content, such as a website or other type of data file or user interface, that may be used in an implementation that provides financial assessment specific advice. The arrangement of data, windows, and other items shown in FIG. 4 is exemplary only, and any suitable arrangement may be used.

As shown in the example page of content of FIG. 4 that may be provided to a user in an implementation, specific advice 410 that may be actionable and personalized may be provided on a page of content 400 displayed on the user computing device 80. Advice may be directed to medical insurance advice, disability coverage, life insurance, auto insurance, home insurance and mortgage payments, estate planning, debt (consumer, household), retirement planning, and college savings, for example, though the advice is not limited to these areas. The advice may provide specific dollar amounts in various implementations.

The specific advice may be actionable, meaning that the user can take some particular action to follow the advice, and the advice may be personalized, meaning it is generated based on the user's data.

Thus, the financial assessment tool outputs specific advice (e.g., "obtain disability coverage that provides at least $X yearly", "buy $X of term insurance", "immediately begin saving X% of income for retirement (employer 401K, IRAs)", etc., where the X's represent numbers determined by the calculations and analyses performed by the financial assessment tool), and may include advice regarding third-parties (e.g., "go to an attorney and set up a will", "go to an attorney and establish guardianship and power of attorney", etc.). The advice may take the form of a "to do" list. In an implementation, the advice is output as a checklist, such as a prioritized checklist.

Examples of specific advice, in an implementation, are directed to disability coverage, life insurance, and retirement savings. An amount of disability coverage may be recommended to the user. The recommended disability coverage may be based on the user's gross annual income. In an implementation, the recommended disability coverage may be determined to be 60 percent of the user's gross annual income. A user may be provided with advice such as "Obtain disability coverage that provides at least $X yearly" (where X is a number), or "Obtain disability coverage that provides at least 60% of your annual income", for example.

An amount of life insurance may be recommended to the user. The recommended life insurance may be based on the user's income and existing life insurance coverage. In an implementation, the recommended life insurance may be an additional amount of life insurance that the user should obtain, and may be determined to be 7 times the user's income less any existing coverage the user already has. Alternatively, a fixed amount of life insurance, such as $250,000, $1,000,000, or $2,000,000, for example, may be recommended. The advice may be provided to the user as "You should buy an additional $X of life insurance" or "Your spouse should buy $X more of life insurance", for example.

An additional amount that the user should put towards retirement savings each month may also be recommended to the user. In an implementation, this amount is determined to be 15 percent of the user's income less the current amount that the user is putting towards retirement savings. The specific advice may be provided to the user as "You should save an additional $X per month toward your retirement" or "You should save an additional X% per month toward your retirement", for example.

Additionally, a rationale 420 for the specific advice 410 may be provided, along with a listing of resources 430 for additional educational material to help the user understand the context for the specific advice 410. Rationales 420 may be, for example, "illness and injury can occur at any time" (for specific health insurance advice), "not having enough insurance may leave you with expensive medical bills or limit the care that you receive" (for specific health insurance advice), "disability can significantly decrease income while increasing medical and care expense, you will need coverage that replaces about 60% of your income" (for specific disability coverage advice), and "buying a policy based on price alone can leave you exposed to large expenses" (for specific auto insurance advice), etc.

The listing of resources 430 may include links to databases, presentations, educational content, websites, Internet addresses, telephone numbers, and names of publications, for example. Thus, the links may be provided to resource materials pertaining to the specific advice, along with additional paths to other products and service recommendations, such as those pertaining to home, health, auto, etc. Links may also be provided to more specific calculators, such as an auto coverage calculator, allowing the user to get advice that is more specific.

Monitoring items 440 and service items 450 may also be displayed on the page of content 400. For example, a user may be advised to review his insurance every two years, review his estate planning documents every three years, rebalance his investments annually, and check his credit report annually. Rationales 420 may be provided for this advice, along with links to resources 430. Service items 450 include lists of calculators or tools that the user may find interesting (e.g., retirement, education, budgeting, etc.), the names of financial planners and advisors that may be available to provide assistance, etc. As with the advice, the monitoring and other service items may be provided in a prioritized order.

Additionally, take action links 460 may also be displayed that a user can select to take action on a particular item of advice (e.g., the user may be presented with a link to select to apply for the recommended amount of life insurance or to open a savings account to begin saving for an emergency fund).

In another implementation, the user may be provided with the specific advice 410, along with prompts that may be selected to view the rationale 420, the resources 430, and the take action links 460. For example, the advice may be "After paying monthly bills, save until your emergency fund is $22,000". In such an implementation, the user may be presented with a "find out why" prompt that he may select for the underlying rationale for that advice, and a "take action" prompt (e.g., "open a savings account") that he may select to act on the advice.

In an implementation, a dynamic benchmarking feature is provided. A user's financial strength score is generated (e.g., from 0 to 100) and displayed 470. The score may be determined by assigning a number of points to some or all of the user's data, and then adding the points together. In an implementation, if the user already has adequate health insurance, 10 points are assigned; if the user already has adequate disability coverage, 10 points are assigned; if the user already has adequate life insurance, 3 points are assigned; and so on. Alternatively, the points may be assigned based on which recommendations are or are not provided to a user. If no health insurance advice is provided to a user (e.g., because the user has adequate coverage), 10 points are assigned; if no disability coverage advice is provided to the user (e.g., because the user has adequate coverage), 10 points are assigned; and so on.

Thus, in an implementation, the financial strength score is a personalized score from 0 to 100 (100 being the top score) based on answers within the financial assessment, that indicates to the user where he ranks compared with a score of 100. Points are assigned to particular areas where the user has either taken action or does not need to take action at the present time. Depending on the score, some information or guidance may be provided regarding the score, how to interpret the score, and how to raise the score, for example.

The financial strength score may be saved and gives a user a relative basis for measuring his progress over time, as it may be regenerated using current data each time he uses the financial assessment tool. A user may update data using the financial assessment tool whenever he chooses, for example, when his marital status changes, when his employment status changes, as the number of dependent children changes. The order of priority and specific advice generated by the financial assessment tool may change, along with the points assigned to a topic, thereby affecting the user's score.

In an implementation, the financial strength score may be compared to the scores of other users who have used the financial assessment tool. For example, the financial strength score may be compared to the scores of all other users, or only to the scores of users in a particular user group or population. Thus, a user may see how he compares not only relative to a score of 100, but also to a particular user group or population, such as married people over the age of 50, or employed single people, for example. Maintaining the scores of a user group or population also allows the overall progress and advice taken by a user group or population to be tracked by an entity that maintains, collects, or analyzes the scoring data, for example.

The advice that is provided to a user may be dynamic and may change over time or be updated as data pertaining to the user changes. The user may update the data, which in turn updates the advice and other associated content that may be provided to the user. In an implementation, the user can access the advice list directly and remove or otherwise update items from the list. This may lead to a subsequent regeneration of the content provided to the user. Alternatively, the financial assessment tool can automatically update the advice list as the user adds or removes services or changes data (e.g., has a baby, or gets a salary increase). In an implementation, the financial assessment tool queries the storage devices from time to time, and updates the user's data and generates advice accordingly.

Figure 5:
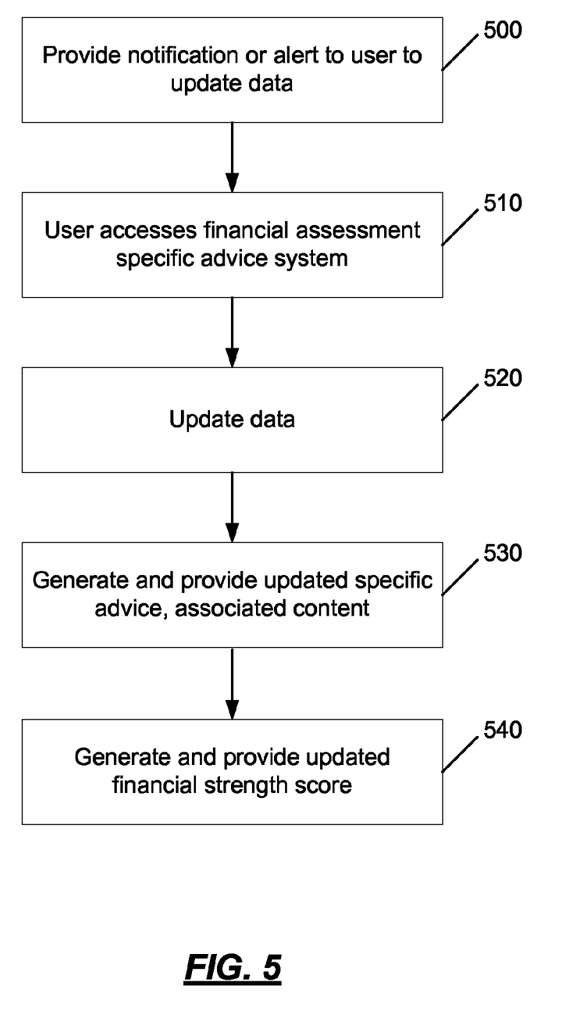
FIG. 5 is an operational flow of another implementation of a financial assessment specific advice method.

FIG. 5 is an operational flow of another implementation of a financial assessment specific advice method. After a user has initially provided data and the financial assessment tool has performed a financial assessment determination and generated specific advice and additional content, the user may wish to update the data and receive updated specific advice and additional content. In an implementation, a notice or alert is sent to the user, for example via email or a telephone call, to remind or otherwise prompt the user to update the financial assessment. The notice or alert may be sent only once, or may be sent more frequently, such as every few weeks or months, every year, or after a certain number of days, weeks, or months of user inactivity.

At operation 500, an optional notification or alert is provided to the user to prompt the user to update the data used by the financial assessment specific advice system. At operation 510, the user logs into or otherwise accesses the system, and at operation 520 the user updates the data displayed by the financial assessment tool. Operations described above, such as those described with respect to FIG. 1, may be performed by the financial assessment tool in receiving and retrieving the updated data, from local and external storage devices and from the user.

At operation 530, the financial assessment tool generates and provides updated specific advice and associated content, based on the updated data provided by the user and retrieved from storage. The financial assessment tool may highlight or otherwise explain advice and content that is new or has been modified as compared with the previous advice and content that was provided to the user. At operation 540, a financial strength score is generated and provided, perhaps along with the user's previous financial strength score. This allows the user to determine if his relative financial strength has improved pursuant to the modified data provided.

Figure 6:
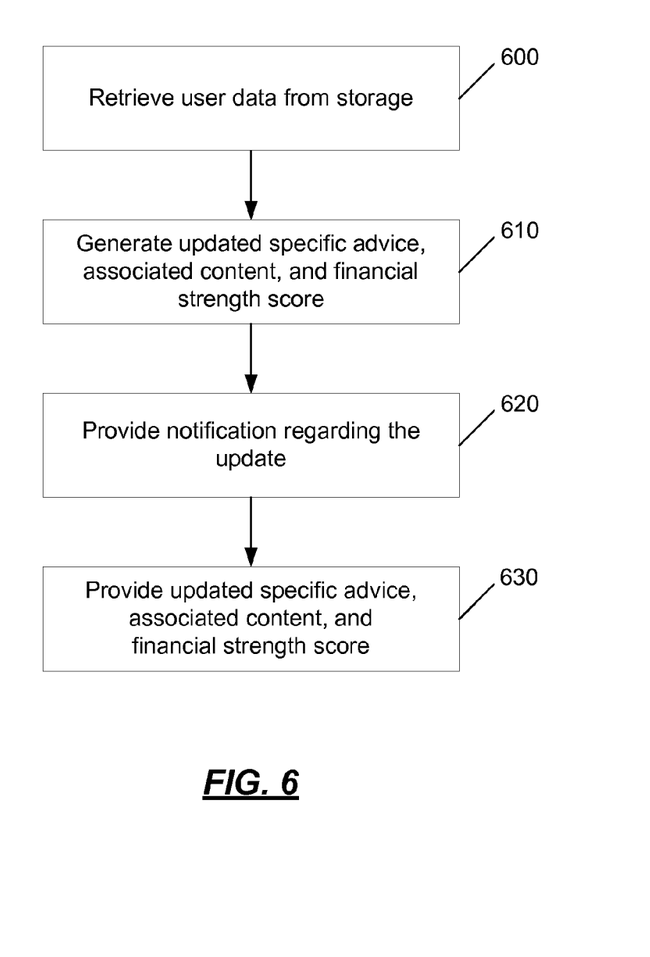
FIG. 6 is an operational flow of another implementation of a financial assessment specific advice method.

FIG. 6 is an operational flow of another implementation of a financial assessment specific advice method. The user does not directly provide updated data to the system or tool. Instead, at operation 600, the financial assessment tool retrieves the user data from local and external storage devices, and at operation 610, performs a financial assessment determination and generates updated specific advice and associated content, along with an updated financial strength score. The updated advice and content will take into account any changes to the pertinent data that had been made since the previous advice and content generation, for example, when a user updated his profile, purchased additional products or services, paid off a loan, etc.

At operation 620, a notification or alert is provided to the user to advise the user that the financial assessment specific advice system has generated updated specific advice, content, and a financial strength score. The notification or alert may contain a summary of the revisions, the advice, the score, and/or a link to the updated advice, content, and score, for example. At operation 630, the user may access the financial assessment specific advice system and is provided with the updated specific advice and associated content, along with the updated financial strength score.

Exemplary Computing Arrangement

Figure 7:
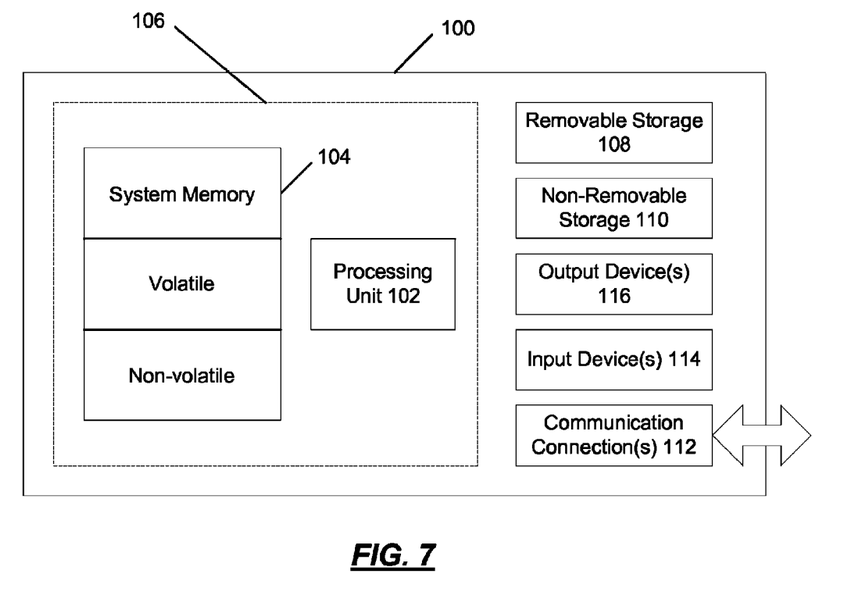
FIG. 7 is a block diagram of an example computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality. Neither should the computing environment be interpreted as having any dependency or requirement relating to any one or combination of components illustrated in the exemplary operating environment.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 7 by dashed line 106.

Computing device 100 may have additional features/functionality. For example, computing device 100 may include additional storage (removable and/or non-removable) including, but not limited to, magnetic or optical disks or tape. Such additional storage is illustrated in FIG. 7 by removable storage 108 and non-removable storage 110.

Computing device 100 typically includes a variety of computer-readable media. Computer-readable media can be any available media that can be accessed by computing device 100 and includes both volatile and non-volatile media, removable and non-removable media. By way of example and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of computing device 100.

Computing device 100 may also contain communication connection(s) 112 that allow the device to communicate with other devices. Communication connection(s) 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object oriented programming language to communicate with a computer system. However, the program (s) can be implemented in assembly or machine language, if desired. In any case, the language may be a compiled or interpreted language, and may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A financial assessment specific advice method performed by a computer, comprising: providing a financial assessment computing device comprising a processor; storing a plurality of profiles in a storage associated with the financial assessment computing device, each of the profiles directed to a different type of user; receiving a request for a financial assessment determination from a user via a computing device of the user at the financial assessment computing device via a network; determining one of the plurality of profiles for the user; retrieving the determined profile of the plurality of profiles from the storage; performing the financial assessment determination for the user at the financial assessment computing device using the profile retrieved from the storage; generating, using the processor, a plurality of pieces of specific advice using the financial assessment determination; prioritizing, using the processor, the plurality of pieces of specific advice in a prioritized advice order using the determined profile of the user, the marital status of the user, an employment status of the user, a number of dependent children of the user, and an age of the user; and providing the prioritized plurality of pieces of specific advice in the prioritized advice order to the user via the computing device of the user from the financial assessment computing device over the network.

2. The method of claim 1, further comprising retrieving data for the financial assessment determination from the storage, the data associated with the user.

3. The method of claim 2, further comprising:
requesting additional data for the financial assessment determination via a template; and
receiving the additional data from the user via the template.

4. The method of claim 1, further comprising providing a rationale for the specific advice and a resource for the specific advice.

5. A financial assessment specific advice method performed by a computer, comprising: providing a financial assessment computing device having a processor; storing a plurality of profiles in a storage associated with the financial assessment computing device, each of the profiles directed to a different type of user; receiving a request for a financial assessment determination from a user via a computing device of the user at the financial assessment computing device via a network; determining one of the plurality of profiles for the user; retrieving the determined profile of the plurality of profiles from the storage; performing the financial assessment determination for the user at the financial assessment computing device using the profile retrieved from the storage; generating, using the processor, a financial strength score using the financial assessment determination; generating, using the processor, a plurality of pieces of specific advice using the financial assessment determination; prioritizing, using the processor, the plurality of pieces of specific advice in a prioritized advice order using the determined profile of the user, a marital status of the user, an employment status of the user, a number of dependent children of the user, and an age of the user to improve the financial strength score; and providing the financial strength score and the prioritized plurality of pieces of specific advice in the prioritized advice order to the user via the computing device of the user from the financial assessment computing device over the network.

6. A non-transitory computer-readable storage medium comprising a plurality of computer-readable instructions tangibly embodied on the computer-readable storage medium, which, when executed by a processor provide financial assessment specific advice, said computer-readable instructions comprising instructions that: store a plurality of profiles in a storage associated with a financial assessment computing device, each of the profiles directed to a different type of user; receive a request for a financial assessment determination from a user via a computing device of the user at the financial assessment computing device via a network; determine one of the plurality of profiles for the user; retrieve the determined profile of the plurality of profiles from the storage; perform the financial assessment determination for the user at the financial assessment computing device using the profile retrieved from the storage; generate, using the processor, a plurality of pieces of specific advice using the financial assessment determination; prioritize, using the processor, the plurality of pieces of specific advice in a prioritized advice order using the determined profile of the user, a marital status of the user, an employment status of the user, a number of dependent children of the user, and an age of the user; and provide the prioritized plurality of pieces of specific advice in the prioritized advice order to the user via the computing device of the user from the financial assessment computing device over the network.

7. The non-transitory computer-readable storage medium of claim 6, further comprising instructions that retrieve data for the financial assessment determination from the storage, the data associated with the user.

8. The non-transitory computer-readable storage medium of claim 7, further comprising instructions that:
request additional data for the financial assessment determination via a template; and
receive the additional data from the user via the template.

9. The non-transitory computer-readable storage medium of claim 6, further comprising instructions that provide a rationale for the specific advice and a resource for the specific advice.

10. A non-transitory computer-readable storage medium comprising computer-readable instructions tangibly embodied on the computer-readable storage medium, which, when executed by a processor provide financial assessment specific advice, said computer-readable instructions comprising instructions that: store a plurality of profiles in a storage associated with a financial assessment computing device, each of the profiles directed to a different type of user; receive a request for a financial assessment determination from a user via a computing device of the user at the financial assessment computing device via a network; determine one of the plurality of profiles for the user; retrieve the determined profile of the plurality of profiles from the storage; perform the financial assessment determination for the user at the financial assessment computing device using the profile retrieved from the storage; generate, using the processor, a financial strength score using the financial assessment determination; generate, using the processor, a plurality of pieces of specific advice using the financial assessment; prioritize, using the processor, the plurality of pieces of specific advice in a prioritized advice order using the determined profile of the user, a marital status of the user, an employment status of the user, a number of dependent children of the user, and an age of the user to improve the financial strength score; and provide the financial strength score and the prioritized plurality of pieces of specific advice in the prioritized advice order to the user via the computing device of the user from the financial assessment computing device over the network.

11. A financial assessment specific advice system, comprising: at least one subsystem that stores a plurality of profiles in a storage associated with a financial assessment computing device, each of the profiles directed to a different type of user; at least one subsystem that receives a request for a financial assessment determination from a user via a computing device of the user at the financial assessment computing device via a network; at least one subsystem that determines one of the plurality of profiles for the user; at least one subsystem that retrieves the determined profile of the plurality of profiles from the storage; at least one subsystem that performs the financial assessment determination for the user at the financial assessment computing device using the profile retrieved from the storage; at least one subsystem that generates a plurality of pieces of specific advice using the financial assessment determination; at least one subsystem that prioritizes the plurality of pieces of specific advice in a prioritized advice order using the determined profile of the user, a marital status of the user, an employment status of the user, a number of dependent children of the user, and an age of the user; and at least one subsystem that provides the prioritized plurality of pieces of specific advice in the prioritized advice order to the user via the computing device of the user from the financial assessment computing device over the network.

12. The system of claim 11, further comprising at least one subsystem that retrieves data for the financial assessment determination from the storage, the data associated with the user.

13. The system of claim 12, further comprising:
   at least one subsystem that requests additional data for the financial assessment determination via a template; and
   at least one subsystem that receives the additional data from the user via the template.

14. The system of claim 11, further comprising at least one subsystem that provides a rationale for the specific advice and a resource for the specific advice.

15. A financial assessment specific advice system, comprising: at least one subsystem that stores a plurality of profiles in a storage associated with a financial assessment computing device, each of the profiles directed to a different type of user; at least one subsystem that receives a request for a financial assessment determination from a user via a computing device of the user at the financial assessment computing device via a network; at least one subsystem that determines one of the plurality of profiles for the user; at least one subsystem that retrieves the determined profile of the plurality of profiles from the storage; at least one subsystem that performs the financial assessment determination for the user at the financial assessment computing device using the profile retrieved from the storage; at least one subsystem that generates a financial strength score using the financial assessment determination; at least one subsystem that generates a plurality of pieces of specific advice using the financial assessment determination; at least one subsystem that prioritizes the plurality of pieces of specific advice in a prioritized advice order using the determined profile of the user, a marital status of the user, an employment status of the user, a number of dependent children of the user, and an age of the user to improve the financial strength score; and at least one subsystem that provides the financial strength score and the prioritized plurality of pieces of specific advice in the prioritized advice order to the user via the computing device of the user from the financial assessment computing device over the network.

16. The method of claim 1, further comprising providing a plurality of selectable actions associated with at least one of the plurality of pieces of specific advice to the computing device of the user via the network, each of the selectable actions comprising a user selectable link to take an action with respect to the at least one of the plurality of pieces of specific advice.

17. The method of claim 16, further comprising:
   receiving an indication that one of the selectable actions has been selected;
   updating the plurality of pieces of specific advice; and
   highlighting a change in the updated plurality of pieces of specific advice compared to the plurality of pieces of specific advice prior to the update.

18. The method of claim 1, further comprising providing:
   a plurality of monitoring items that are provided in a prioritized order using the determined profile of the user; and
   a plurality of service items that are provided in a prioritized order using the determined profile of the user.

* * * * *